June 6, 1950 J. R. DAY 2,510,868

WAVE TRANSMISSION FILTER CIRCUITS

Filed Dec. 14, 1945 2 Sheets-Sheet 1

JAMES R. DAY
INVENTOR.

BY John J. Rogan

ATTORNEY

WAVE TRANSMISSION FILTER CIRCUITS

Filed Dec. 14, 1945 2 Sheets-Sheet 2

JAMES R. DAY
INVENTOR.

BY John J. Rogan
ATTORNEY

Patented June 6, 1950 2,510,868

UNITED STATES PATENT OFFICE 2,510,868

WAVE TRANSMISSION FILTER CIRCUITS

James R. Day, Peconic, N. Y., assignor to Press Wireless, Inc., New York, N. Y., a corporation of Delaware Application December 14, 1945, Serial No. 634,953

1 Claim. (Cl. 178—44)

This invention relates to wave signalling systems and more especially to such systems as employ one or more piezo crystals as a circuit control element.

A principal object of the invention is to provide a novel and relatively simple manner of incorporating a piezoelectric device, such as a quartz crystal, in electron tube circuits to control either the selective transmission characteristics, the generation of oscillations, or the modulation of oscillations by signals.

Another object is to provide an improved wave transmission network utilizing more efficiently the series resonance characteristics of a quartz crystal and the like.

Another object is to provide an improved oscillatory system employing a coupling network which incorporates a quartz crystal, and wherein the stability of the network is relatively independent of reactance changes in other parts of the system not directly forming part of said network.

A feature of the invention relates to an improved wave filter network comprising a cathode follower driver tube which is coupled through a series resonant quartz crystal network to another tube.

Another feature relates to an improved oscillator generator comprising a pair of grid-controlled electron tubes, one of which is connected as a cathode follower driver for the other tube and wherein the tubes are coupled by a series resonance quartz crystal arrangement.

Another feature relates to a modulator network employing a pair of electron tubes interconnected to act as a sustained wave generator, one of said tubes being of the cathode follower type and with its cathode load circuit coupled to the input circuit of the other tube through a quartz crystal arrangement, in conjunction with means for signal modulating the effective coupling coefficient of said arrangement.

A further feature relates to an improved crystal-controlled network for sharply discriminating between waves of closely adjacent frequencies.

A further feature relates to a suitable and relatively simple single frequency transmission network employing a pair of grid-controlled electron tubes whose cathodes are connected together through a quartz crystal which serves to transfer the cathode load variations of one tube to the other tube.

A still further feature relates to the novel organization, arrangement, and relative interconnection of parts for obtaining a high degree of selectivity or for obtaining suitable self-sustained oscillations through the intermediary of a quartz crystal.

Other features and advantages not particularly enumerated may be apparent after a consideration of the following detailed description and the appended claims.

Figure 1:
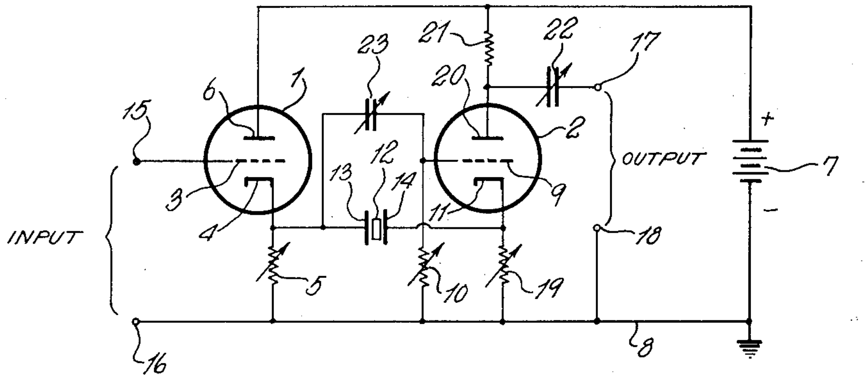
Fig. 1 is a schematic circuit diagram of a highly selective transmission network or filter according to the invention.

Referring to Fig. 1 of the drawing, there is shown a selective transmission network substantially in the nature of a single frequency filter comprising a pair of grid-controlled electron tubes 1, 2, which may be of any well-known type. While the drawing shows these tubes as conventional triodes, any other well-known type of tube may be employed, such as screen grid tubes, pentodes, and the like. A source of signal frequencies can be connected to the control grid 3 and to the cathode 4 through a cathode load or follower impedance 5 which is preferably a non-inductive resistor. The plate or anode 6 is connected to the positive terminal of any suitable D. C. power supply, which for simplicity is represented as a battery 7, the negative terminal of which is connected to the common ground return 8. The tube 1 therefore acts as a so-called cathode follower, wherein the potential variations across the cathode load resistor 5 are transferred to the input circuit of tube 2. With this arrangement the impedance from the cathode 4 to ground will be low because of the degenerative action of the cathode follower connection. Consequently, any stray circuit or tube capacitances across this relatively low impedance will have very little effect on the frequency response of the crystal coupling network to be described. Preferably, although not necessarily, tube 2 is operated as a grounded grid amplifier having its control grid 9 connected to ground for direct current through a suitable resistor or impedance 10. The cathode 4 of tube 1 is coupled to the cathode 11 of tube 2 through the intermediary of a piezo crystal 12 which is mounted in any well-known type of crystal holder between excitation electrodes 13, 14. Crystal 12 may be any well-known form of quartz crystal which is suitably cut from its matrix so as to have a dominant mode of vibration at the particular frequency to be transmitted between the input terminals 15, 16, and the output terminals 17, 18. The cathode 11 is connected to ground through a resistor 19 which is of the same order of resistance as the equivalent resistance component of the crystal 12.

Figure 2:
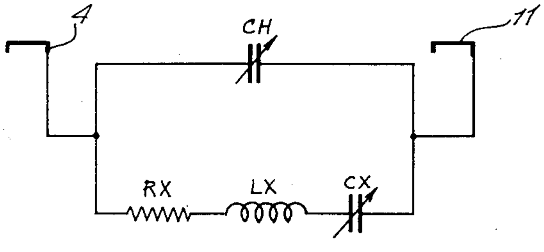
Fig. 2 is an equivalent or analogous diagram of the crystal coupling portion of Fig. 1.

For purposes of explanation, the equivalent impedance components of the crystal and holder are schematically analyzed in Fig. 2. In this figure, the equivalent resistance of the crystal is designated RX. The equivalent inductive reactance is LX and the equivalent capacitance reactance is CX. The equivalent capacitive reactance of the crystal holder or mountings is CH.

The plate or anode 20 of tube 2 is connected to the positive terminal of the D. C. power supply 7 through a suitable load resistor 21 which is connected to output terminal 17 through a suitable coupling condenser 22.

The selective action of the above described network is along the following lines. The application of an alternating current wave to grid 3 and ground, causes a corresponding alternating current to flow in the plate-cathode circuit of tube 1 giving rise to a corresponding alternating current voltage drop across resistor 5. This varying voltage is applied through crystal 12 to cathode 11. Hence at the resonant frequency of the crystal, i. e. at the resonance of the electro-mechanical equivalents LX and CX (Fig. 2), a fraction $$\frac{R3}{R3-RX}$$

of the voltage across resistor 5 is applied to the cathode 11 as an input signal to tube 2. In this fraction, R3 is the resistance of element 19, and RX is the equivalent resistance of the crystal unit. As the frequency of the input voltage applied to terminals 15, 16 is removed from the crystal resonance, the impedance of the crystal unit rises rapidly to a value many times that of RX. As a result, the transfer of signal frequency to the input of tube 2 is highly selective.

The equivalent capacity CH of the crystal holder and mountings provides a signal path to the input of Fig. 2, which is comparatively independent of frequency and hence would tend to derogate from the desired selectivity of the desired crystal coupling arrangement. To avoid this drawback, a voltage equal in magnitude and phase to the voltage at cathode 11 through the equivalent capacitance CH is applied to grid 9 through the capacitor 23 and impedance 10. As a result, the grid and cathode of tube 2 have no voltage difference attributable to current through the equivalent capacity CH of the crystal holder and mounting. In other words this equivalent capacity CH is neutralized by the the elements 23 and 10.

The independent voltage variations at cathode 11 attributable to the unneutralized branch RX, LX, CX, give rise to amplified voltage variations across the resistor 21 which is coupled to the output terminals through condenser 22 having negligible reactance at the operating frequencies of the system.

Summarizing the above, tube 1 being a cathode follower, supplies at low impedance and at no gain, a facsimile of the input signal at terminals 15 and 16 to the input electrodes of tube 2 through the impedance of the crystal unit 12.

At the series resonant frequency of this crystal unit the transfer is a maximum. By using a grounded grid amplifier tube 2, it is possible to achieve the above described neutralization of the equivalent capacitance CH. Furthermore, the grid 9 being grounded acts to screen electrostatically the crystal coupling circuit per se from any reactance changes in the output circuit. Therefore the crystal coupling circuit is substantially independent of undesired reactance changes at the input terminals and undesired reactance changes at the output terminals. In designing the particular circuit illustrated, the resistances 5 and 19 are of the values usually required to cause the tubes 1 and 2 to operate on the linear portion of their grid voltage plate current characteristics. Resistance 10 will then have a resistance substantially equal in value to the parallel combination of resistance 19 and the variational or dynamic resistance offered by tube 2. Capacitance 23 may be substantially equal to the equivalent capacitance CH, while resistance 21 may be selected of any suitable value to afford the desired high impedance in the output circuit at the operating frequencies.

In some instances it may be desirable to operate the circuit of Fig. 1 without neutralizing the equivalent capacitance CH of the crystal and its holder. In that case a rejection or high attenuation frequency is found near the resonance frequency of the crystal. In some applications this "slot" is useful in securing a maximum of discrimination between two currents of nearly the same frequency. The location of the attenuation slot with respect to the series resonance frequency of the crystal is easily adjustable by changing the magnitude of either capacitor 23 or impedance 10, or both, or by changing the phase angle of these combined elements. Actual performance tests with the above described arrangement have shown band widths of about 7 and 150 cycles at operating frequencies of 50,000 C. P. S. and 450,000 C. P. S. respectively in circuits using crystals ground for these operating frequencies. The same crystals employed in conventional and more elaborate circuits provided band widths of 15 and 250 cycles respectively. The degree of selectivity may conveniently be changed by variations in either resistance 5 or resistance 19.

Figure 3:
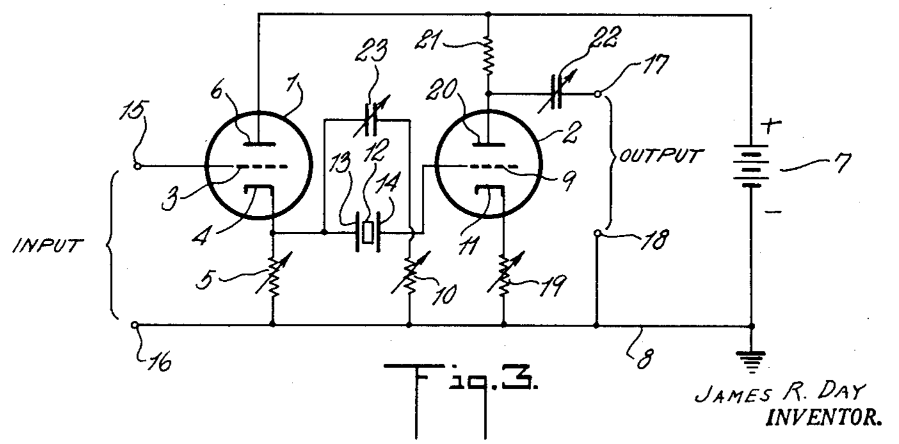
Fig. 3 is a modification of Fig. 1.

It will be understood that the arrangement of Fig. 1 is not limited to the grounded grid amplifier for tube 2. Thus, as shown in Fig. 3, the crystal can be connected to the control grid 9, and the capacitance 23 can be connected to the cathode 11.

Figure 4:
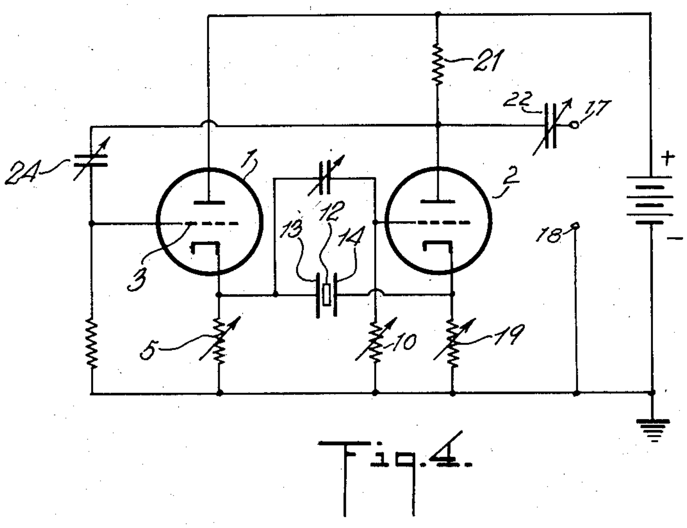
Fig. 4 shows the invention embodied in an oscillator generator system.

At the series resonant frequency of the crystal unit 12, it will be noted that the phase of the output voltage is the same as that of the input. This arrangement therefore can be utilized to provide a highly stable single frequency oscillator such as shown in Fig. 4. In this figure the parts which are the same as those of Fig. 1 bear the corresponding designation numerals. If resistance 21 is adjusted to provide at the operating frequency a voltage at least equal to the input voltage applied to grid 3 through feedback control capacitor 24, sustained oscillations at the series resonant frequency of the crystal will result, providing of course that the equivalent capacitance of the crystal and its mountings are neutralized as above described.

Figure 5:
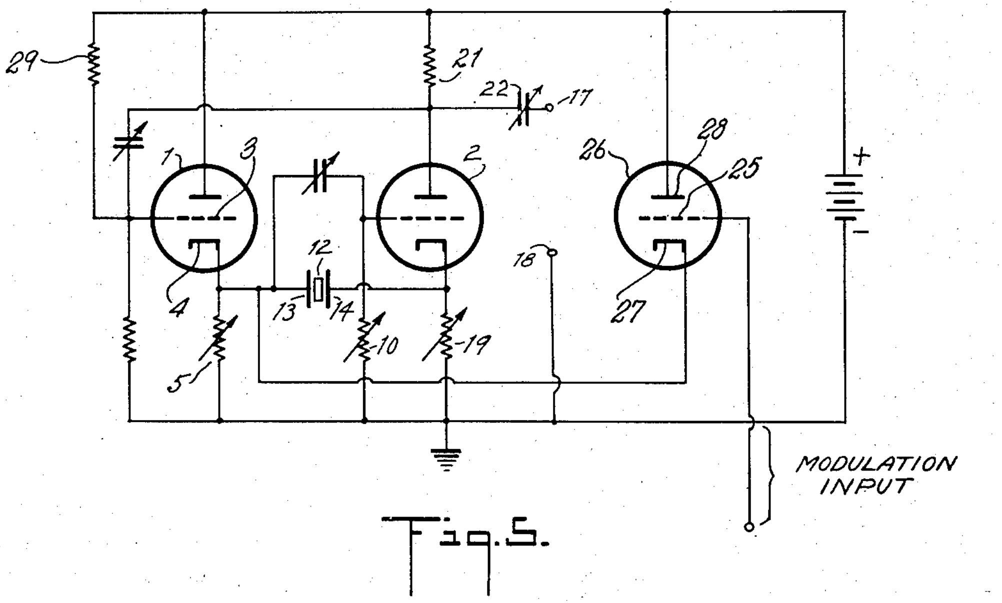
Fig. 5 shows the invention embodied in a modulated oscillator system.

Fig. 5 shows how the invention can be applied to produce modulated oscillations without varying the frequency of the generated oscillations. In this embodiment the oscillator generator is the same as that of Fig. 4 and the parts corresponding thereto bear the sam designation numerals. In this modulated oscillator the input signals are applied to the control grid 25 of any suitable modulator tube 26 whose cathode 27 is connected to the cathode 4 and whose plate or anode 28 is connected through resistor 29 to the control grid 3. The variations in impedance or plate resistance of tube 26 cause corresponding variations on the grid 3 to in turn modulate the amplitude of the generated oscillations and this variation in amplitude is effected without changing the oscillation frequency.

Actual tests of the oscillator of Figs. 4 and 5 showed very high stability with respect to changes in the resistances and capacitances and with respect to changes in the plate supply voltage. Even higher stability was maintained by replacing resistance 5 or resistance 19 by a non-linear resistor, such as a lamp filament whose resistance increases as the current through it rises.

While certain particular embodiments of the inventive concept have been illustrated and described, it will be understood that various changes and modifications may be made therein without departing from the spirit and scope of the invention.

What is claimed is:

A filter network comprising, a pair of grid-controlled electron tubes, a cathode load resistor for the first tube, a cathode load resistor for the second tube, a piezoelectric crystal connected directly between the cathode of the first tube and the control grid of the second tube, and a capacitor and resistor connected across the first cathode load resistor for neutralizing undesired capacity coupling through the inherent mounting capacities of said crystal.

JAMES R. DAY.

REFERENCES CITED

The following references are of record in the file of this patent:

UNITED STATES PATENTS

| Number | Name | Date |
|---|---|---|
| 2,054,757 | Lamb | Sept. 15, 1936 |
| 2,205,847 | Crosby | June 25, 1940 |
| 2,396,224 | Artzt | Mar. 12, 1946 |

OTHER REFERENCES

Wireless Engineer, Nov. 1944, pages 525/526. (Cathode-coupled Oscillators by Butler.)